United States Patent

[11] 3,557,818

[72] Inventor William J. Rohde
 Sycamore, Ill.
[21] Appl. No. 752,704
[22] Filed Aug. 14, 1968
[45] Patented Jan. 26, 1971
[73] Assignee Olin Corporation
 Stamford, Conn.
 a corporation of Virginia. by mesne assignment

[54] FUEL REGULATOR FOR PROPANE APPLIANCES
 8 Claims, 4 Drawing Figs.
[52] U.S. Cl. ..................................... 137/118,
 137/233, 137/614.02
[51] Int. Cl. ........................................ G05d 16/06
[50] Field of Search .......................... 137/118,
 614.02, 233, 505.42, 613, 614, 212, 209, 608

[56] References Cited
 UNITED STATES PATENTS
| | | | |
|---|---|---|---|
| 2,615,287 | 10/1952 | Senesky | 137/505.42 |
| 3,259,274 | 7/1966 | Klasson | 137/505.42 |
| 3,260,278 | 7/1966 | Lund | 137/505.42 |
| 3,462,117 | 8/1969 | Lind | 137/608 |

Primary Examiner—William F. O'Dea
Assistant Examiner—William H. Wright
Attorney—Hill, Sherman, Meroni, Gross and Simpson

ABSTRACT: A fuel regulator for a propane appliance wherein a preset spring biased valve member such as a "tire valve" is disposed in series between an inlet from a propane source and a plurality of separate outlets and is controlled by a diaphragm regulator so that gaseous fuel may be supplied to each of the plurality of separate outlets at a constant pressure.

PATENTED JAN 26 1971

INVENTOR.
William J. Rohde
BY Hill, Sherman, Meroni, Gross & Simpson ATTORNEYS

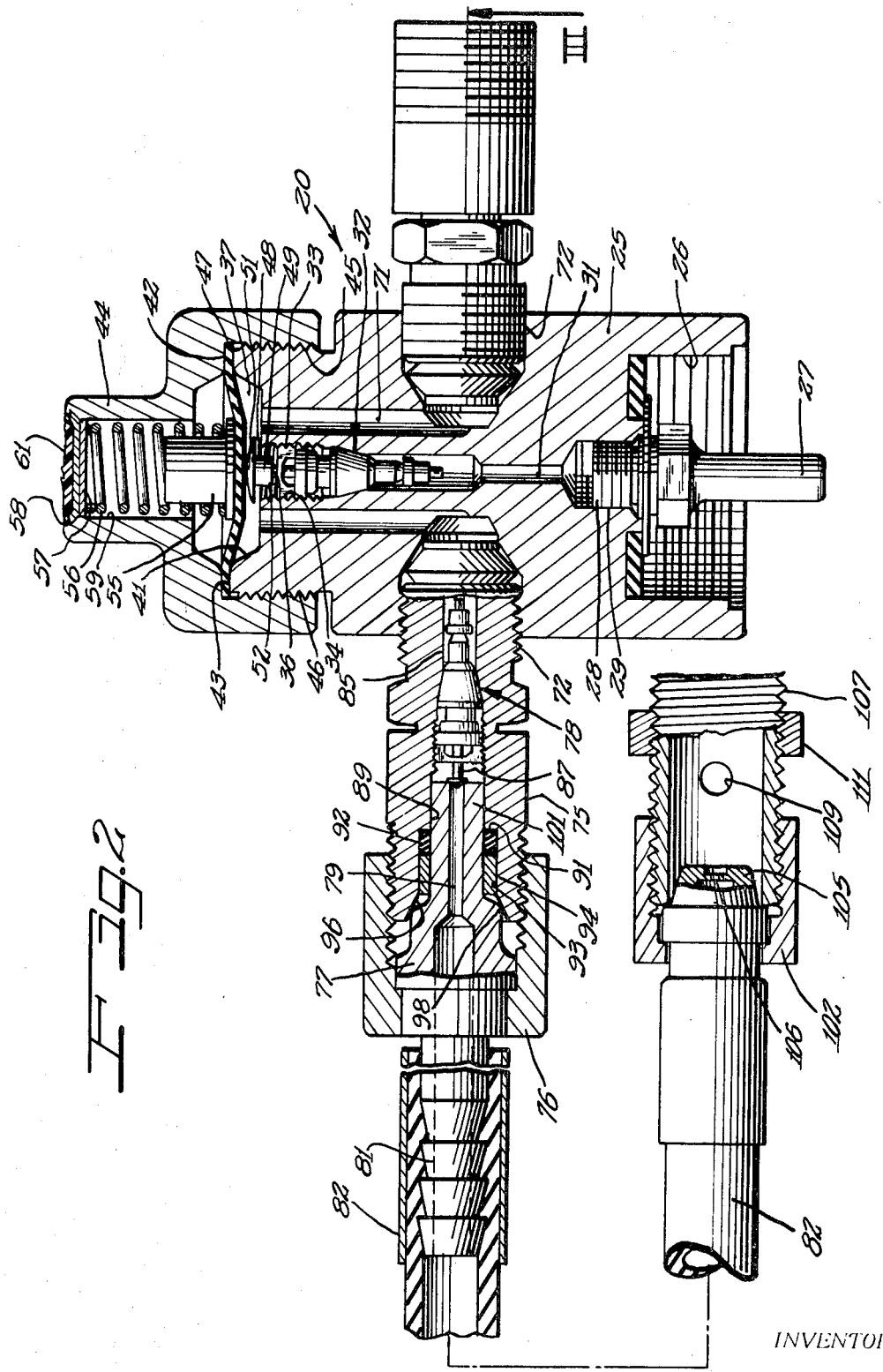

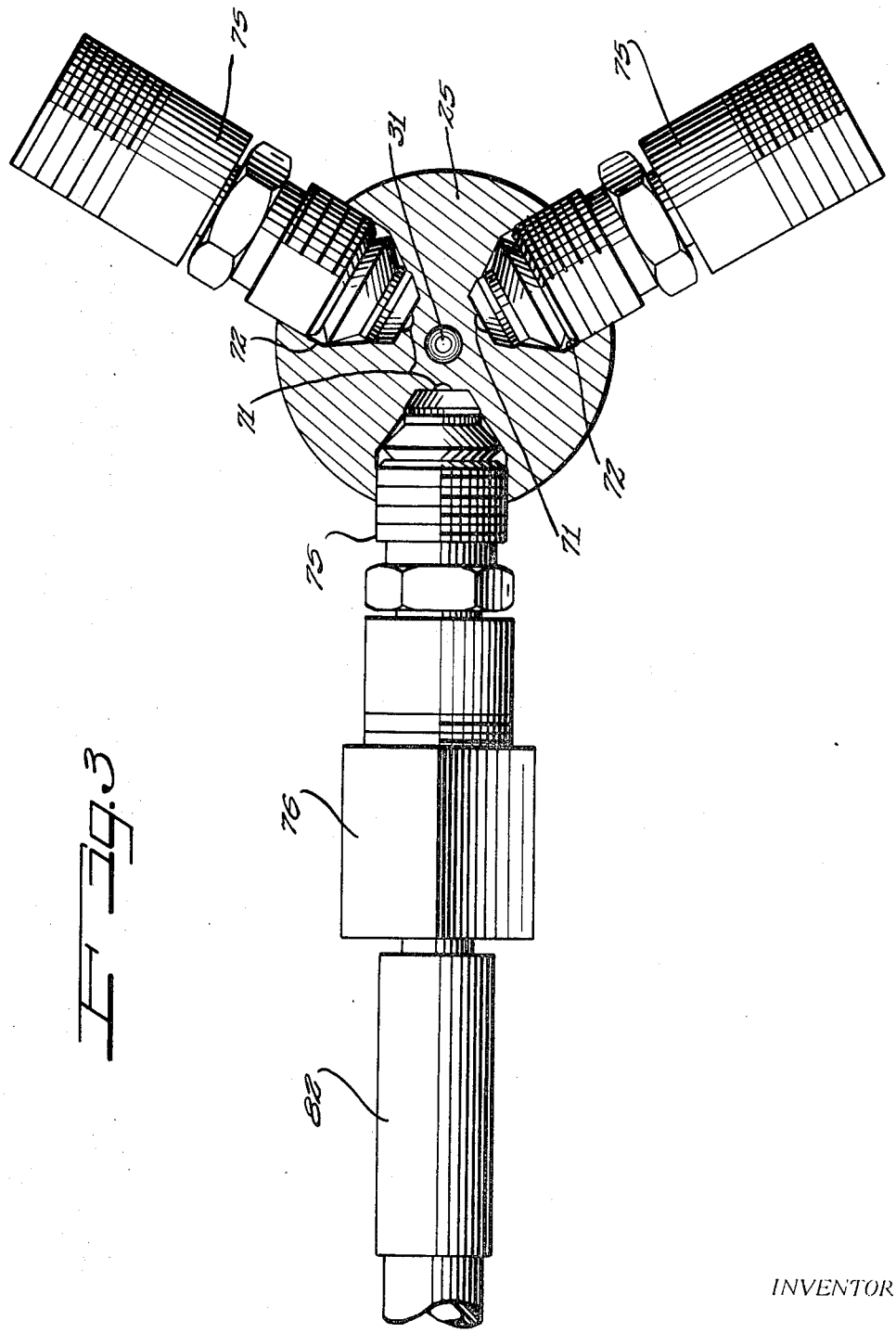

3,557,818

FUEL REGULATOR FOR PROPANE APPLIANCES

BACKGROUND OF THE INVENTION

1. Field of the Invention

This invention relates to a pressure regulator valve for supplying a constant pressure fuel to a plurality of separate outlets for varying outlet demands and varying ambient temperature conditions.

2. Description of the Prior Art

Variations in the ambient temperature of the surrounding environment of use to a propane or gas appliance results in changes in pressure of the gas both in the supply source and in the appliance. Such difficulty is greatest at extremes of outside temperature, either very cold, such as 0° F., where the great decrease in pressure brought about by such cold surroundings could make the burners almost inoperable, or very hot, such as in excess of 100° F., where increased volatility may be expected. In copending application, Ser. No. 711,631, filed Mar. 8, 1968, a regulating valve for a propane appliance is disclosed. However, only a single appliance can be used in conjunction therewith.

Utilizing a common propane or gas source for simultaneously operating a plurality of appliances, for example— a camp stove, a lantern, and a tent heater, is both advantageous and convenient. It should be understood, that varying the demand of any one of a plurality of appliances, without appropriate pressure compensating means, will vary the flow available to the other appliances, utilizing the common propane source. Conventional valves for use with propane appliance do not provide a constant pressure at each of a plurality of outlets when the demand on any one outlet is varied.

SUMMARY OF THE INVENTION

The present invention overcomes the shortcomings of the prior art by providing a pressure regulator valve which provides its own manifold for providing a constant pressure at each of a plurality of separate outlets regardless of the ambient temperature of the surrounding environment and of variations in the demand upon any given outlet. Thus, the present invention provides a means for utilizing a common gas source for efficiently operating a plurality of gas appliances regardless of extremes of ambient temperature. A regulator valve, constructed in accordance with the present invention, includes a body having an inlet for connection to a source of propane fuel and having a plurality of separate outlets. The body portion includes a diaphragm chamber in which is located an integral flexible diaphragm secured to a portion of the body by means of a cap. A core valve of the so-called "tire valve" type is disposed in a passageway connecting the inlet to the diaphragm chamber. The valve includes an actuating stem extending into the diaphragm chamber and engaging one side of the diaphragm. A spring biasing means engages the other side of the diaphragm for urging the core valve-actuating stem to its normally open position.

In accordance with the present invention, the diaphragm chamber forms an annular manifold connected to the separate outlets by a corresponding plurality of passageways. Further, each separate outlet is provided with its own independently operable safety valve shutoff.

An increase in the pressure within the diaphragm chamber, such as will occur when the demand upon one of the outlets is discontinued, will cause the diaphragm to urge the spring in a direction to allow the core valve stem to move toward its closed position, and thereby, decrease the volume of gas through the core valve and into the diaphragm chamber. In a like manner, a decrease in the pressure within the diaphragm chamber will cause the diaphragm to move under the urging of the spring in a direction to allow the core valve stem to move to permit an increased volume of gas to flow through the core valve and into the diaphragm chamber. In this manner, a constant pressure is supplied to each of a plurality of separate outlets regardless of variations in the demand upon any given outlet.

Further, variations in pressure of the gas within the tank due to variations of the ambient temperature of the surrounding environment will be compensated in a manner similar to that described above and a constant pressure will be provided within the diaphragm chamber, and thus, to each of the outlets.

It is also contemplated by the present invention to provide an improved from of connection between the regulator valve and point of service. A fitting is provided wherein a beveled seating surface is formed for cooperation with a coupling member capable of attachment to an elongated rubber conduit and having a portion configured to include a reduced end similar to a pusher pin for actuating the shutoff valve in the outlet with which the coupling connection is made and a somewhat splined head adapted to sealingly seat and engage the beveled seating surface. A coupling nut clamps the coupling member and the fitting together.

BRIEF DESCRIPTION OF THE DRAWINGS

FIG. 2 is a sectional view of the valve assembly showing the pressure-regulating valve and also illustrating an outlet coupling partially cut away to expose an automatic shutoff valve.

FIG. 3 is a sectional view taken along line III-III of FIG. 2.

DESCRIPTION OF THE PREFERRED EMBODIMENT

Figure 1:
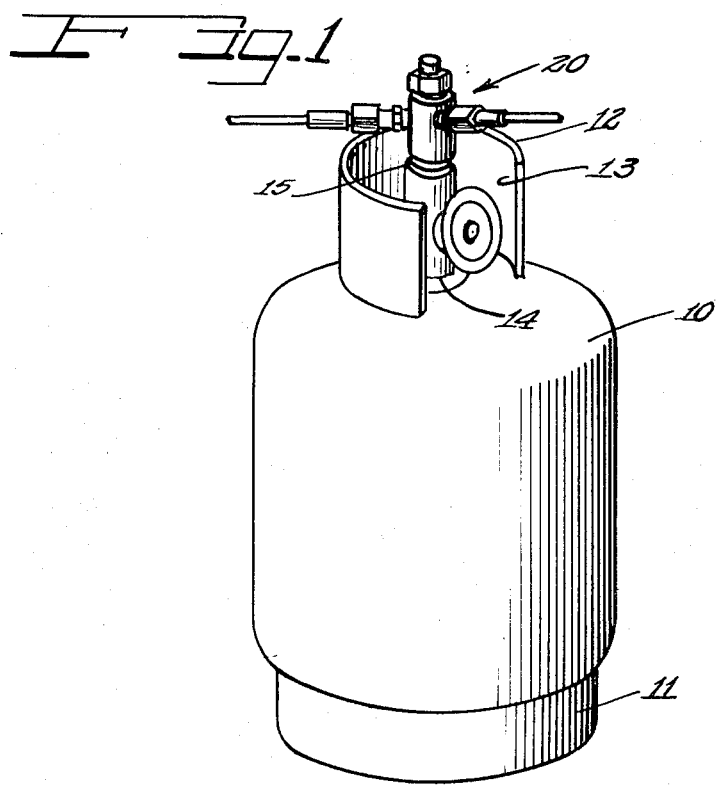
FIG. 1 is a perspective view of a standard large propane cylinder showing the attached pressure regulator valve embodying the present invention.

In the drawings, wherein is shown a preferred embodiment of this invention, there is illustrated s standard propane cylinder designated generally as 10. The propane cylinder 10 includes an annular supporting flange 11 secured to the tank bottom and a tank outlet shield 12 attached to the upper portion of the cylinder. The shield 12 is of part-cylindrical configuration and provides a side opening 13 to facilitate access to the tank outlet. The tank outlet includes a main supply control valve 14 having an externally threaded male fitting 15 for receiving an internally threaded female coupling.

A regulator valve, in accordance with the present invention, is generally designated as 20 as is shown attached to the male fitting 15 of the control valve 14.

Referring now to FIG. 2, wherein is illustrated in detail the regulator valve 20, there is shown a body portion 25 having an internally threaded collar portion 26 for threadedly engaging the male fitting 15 associated with the propane cylinder outlet. A hollow pusher pin 27 having one end externally threaded as at 28 for engaging an internally threaded portion 29 located axially of the threaded collar portion 26 extends axially outwardly of the internally threaded collar. The hollow pusher pin 27 is adapted to actuate an automatic shutoff valve contained in the outlet connection of the propane tank 10 for permitting the flow of gaseous fuel through the hollow pin and into the inlet passage 31 formed in the body 25. Thus, when the internally threaded collar portion 26 is threaded onto the corresponding externally threaded outlet fitting 15 associated with the propane cylinder 10, the pusher pin 27 will automatically open the shutoff valve associated with the propane tank and will permit a flow of gaseous propane fuel through the hollow pin into a centrally located tubular inlet passage 31, thereby placing the further flow of gas under the control of regulator valve 20.

A core valve 32 of the so-called "tire valve" type is carried by the body portion 25 in the passage 31 and includes an externally threaded portion 33 for threadedly engaging a corresponding internally threaded portion 34 formed in the manifold body 25. The core valve 32 further includes an actuating stem 36 which, when depressed, opens valve 32 and permits the passage of fuel through the valve into a diaphragm chamber 37.

It will be noted that the body 25 includes a cuplike recess 41 formed opposite the inlet collar 26. The open end of recess 41 is sealed by means of a flexible diaphragm 42 which overlies an annular shoulder 43 formed on the body 25. A cap 44 including an internally threaded portion 45 for threadedly engaging an externally threaded portion 46 formed on the body 25 is secured to the body 25. A cap 44 including an internally threaded portion 45 for threadedly engaging an externally threaded portion 46 formed on the body 25 is secured to the body 25. The cap 44 further includes an annular shoulder 47 for engaging the diaphragm 42 and for cooperating with the shoulder 43 to clamp the diaphragm in position.

With the flexible diaphragm 42 clamped into position, as described above, one side surface of the diaphragm cooperates with the recess 41 to form the diaphragm chamber 37. The actuating stem 36 of the valve 32 extends into the diaphragm chamber 37 and engages a rivet-shaped abutment member 48 having a hollow stem 49 to provide a socket for receiving the stem 36. The member 48 also has an enlarged head portion 51 which forms abutment area for engaging against the flexible diaphragm 42. The end of the stem 49 forms a stop 52 engageable with a portion of the valve 32 for limiting the total movement of the diaphragm 42.

The diaphragm 42 is also in engagement with the enlarged head of a guide member 55. A spring 56 has its coils piloted on the guide 55 at one end and has its other end bottomed against a washer 57 which is adjustably positioned and locked in place by a retainer 58 cooperating with the adjoining sidewalls of a bore 59 formed in the cap 44.

As shown in FIG. 2, the retainer 58 may take the form of a snap ring made of spring metal and has peripheral lock portions provided by a circumferential row of radially outwardly extending fingers which engage the adjoining walls of the bore 59. Thus, the washer 57 and the retainer 58 are adjustably positioned against the bias of the spring 56 to a preselected calibration. To insure that the preset calibration is not disturbed the recess in the end of the bore 59 outwardly of the retainer 58 may be filled with a suitable sealant such as silicone rubber shown at 61.

The spring 56 urges the diaphragm 42 into engagement with the rivet-shaped abutment member 48 and also urges the actuating stem 36 of the valve 32 toward its depressed position to permit passage of gaseous fuel through the valve into the diaphragm chamber 37.

In accordance with this invention, a plurality of separate outlet passages 71 extend from the diaphragm chamber 37 and are substantially parallel to the centrally disposed inlet passage 31 but spaced radially outwardly therefrom. FIG. 3 shows a transverse cross section through the body 25 and illustrates an arrangement of three outlet passages 71 spaced equiangularly around the centrally disposed inlet passage 31. It should be understood, that a different number of outlet passages may be provided depending upon the particular application of the manifold assembly and the space limitations imposed by the size of the structure. Also all of the outlet passages are shown as extending to a given transverse plane in the valve body, but it should be understood that the outlets could be disposed in different planes.

As shown in FIG. 2, each outlet passage 71 is intersected by a separate radially extending, internally threaded outlet port 72. Each outlet port 72 is adapted to threadedly receive a special fitting generally designated as 75 and including its own automatic shutoff valve 78 to prevent the flow of gaseous fuel from the outlet when that outlet is not being tapped to supply fuel to a propane appliance. The fitting 75 is adapted to threadedly receive a coupling member 76 including a hollow pusher pin 77 formed to actuate the shutoff valve 78 for permitting the flow of fuel into the outlet passageway 79 to be delivered to a propane appliance. The coupling 76 further includes a standard male hose coupling 81 for securing a flexible tube such as 82 to the coupling.

The fitting 75 is formed with a passageway 85 leading from the outlet passage 71 and directing the flow of gaseous fuel through the core valve 78 which is similar in detail to core valve 32 and of the so-called "tire valve" type. An actuating stem 87 extends from the downstream side of the core valve 78. Actuation of stem 87 by depression opens the valve 78 and permits the passage of fuel.

Fitting 75 is also formed with a stepped bore 89 providing a shoulder 91 to receive an O-ring seal 92. The O-ring 92 is retained within the bore 89 by a retaining ring 94 which is press fitted into the enlarged diameter portion 93 of the stepped bore 89.

The fitting 75 is further formed with a conical recess 96. Pusher pin 77 of coupling 76 has an annular shoulder portion 98 formed to provide a generally spherical configuration for sealingly engaging the conical recess 96 to form an efficient mechanical seal despite small misalignments. Pusher pin 77 is also formed with a cylindrical portion 101 having a diameter to provide sealing engagement with the O-ring for effecting a fluid seal in cooperation therewith.

When it is desired to tap a selected outlet to provide fuel to a propane appliance it is only necessary to screw the coupling nut 76 over the fitting 75 until the shoulder 98 properly engages the conical recess 96; in this position the pusher 77 depresses stem 87 of valve 78 to permit the passage of fuel through the outlet fitting. A coupling 102 is provided for attaching the flexible tubing 82 to a propane appliance. In accordance with the present invention, the coupling 102 is formed with an orifice block as at 105 having a restricted orifice opening 106 through which the fuel is discharged into mixing tube 107 connected to the coupling. Air for mixture with the fluid fuel is drawn into the mixing tube 107 through one or more air holes shown at 109 and the resulting mixture is then directed to a point of utilization for combustion. An air adjustment collar 111 is threaded onto the mixing tube 107 and can be adjusted relative to the air holes 109, thereby to control the mixing action of the mixing tube.

The restriction of the gaseous fuel passing through the orifice opening 106 effects a back pressure which acts on the diaphragm 42, thereby insuring that the valve 32 is regulated as a function of outlet pressure.

Figure 4:
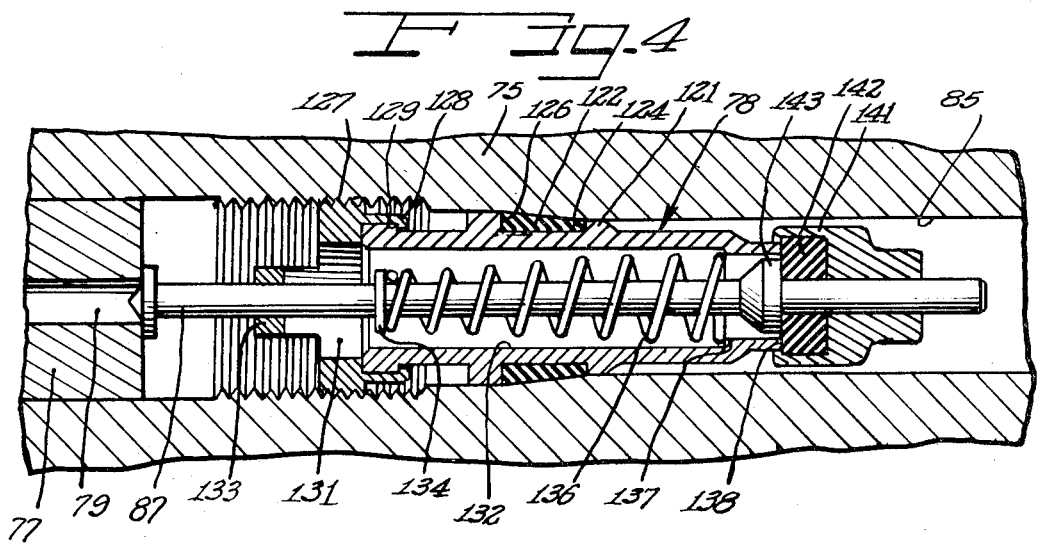
FIG. 4 is a fragmentary enlarged view illustrating additional details of construction of the valve core assembly utilized in both the pressure regulating portion of the valve assembly and in the automatic shutoff valve portion of the outlet.

Referring now specifically to FIG. 4, wherein is illustrated in detail a core valve of the so-called "tire valve" type, a "tire valve" is utilized in the present invention as a regulating valve 32 for controlling the flow of fluid to the diaphragm chamber 37 from the inlet passage 31 and also utilized as an automatic shutoff valve 78 to prevent the flow of fuel from an outlet when it is not desired to tap that outlet.

Details of construction of core valve 32 and core valve 78 are identical, therefore, the details of core valve 78 used as an automatic shutoff valve in the outlet fitting will be identified. The valve 78 includes a hollow tubular body 121 having a recess for receiving an annular sealing ring 122 which seats against the adjoining bore wall of passageway 85 in the fitting 75 in which the valve 78 is located. The recess is formed with a pair of annular shoulders 124 and 126, respectively, for retaining the sealing ring 122.

A bridge member 127 is provided with a flange 128 turned over an annular shoulder 129 at the end of the body 121, thereby to place the bridge member 127 in firm assembly with the body. The bridge member 127 is circumferentially discontinuous and has a lateral opening 131 extending therethrough, thereby freely passing gaseous fuel through a center bore 132 in the body 121 so that the opening 131, in effect, forms an outlet for the valve 78. The bridge 127 is also provided with an opening 133 within which is slidably supported the external actuating pin 87. The pin 87, internally of the body 121, has an annular shoulder 134 against which is bottomed the coils of a coil spring 136; the other end of the coil spring is bottomed against an internal shoulder 137 adjacent an inlet end of the valve shown at 138.

There is attached to the inlet end of the stem 87 a valve head 141 having an enlarged recess in which an annular sealing ring 142 is located. A conical backing member 143 is connected to the stem 87 and is disposed centrally inwardly of the body portion 121 so that the inlet end of the body portion at 138 engages the sealing ring 142, thereby to close the valve 78. The continuous bias exerted by the coils of the spring 136 tends to keep the valve 78 closed, however, when the pin 87 is depressed against the bias of the coil spring 136 the entire valve head 141 will be moved away from the inlet end of the body 121 so that gaseous fuel may pass through the inlet at 138, through the valve 78 and out through the outlet 131.

Referring now again to FIG. 2, with the structure as herein above-described, the forces tending to close the regulating valve 32 include an internal spring 136 of the core valve as well as pressure forces acting on the face of the diaphragm 42 as it forms one wall of the internal diaphragm cavity 37.

The principle forces tending to open the regulating valve 32 include the continuous biasing force exerted by the spring 56 and whatever ambient pressures are acting on the opposite side of the diaphragm 42. With a typical fuel such as propane, volatilization is dependent upon temperature. Hence, in a low temperature environment, a lower fuel pressure is available than when the same fuel supply is in a high temperature environment. The arrangement of the present invention will allow a greater regulating valve opening in a cold ambient and will provide a corresponding reduced valve opening in a hot ambient, thereby insuring that a supply of gaseous fuel at constant pressure will always be available.

It should also be understood, that with a valve having a plurality of separate outlet ports, a variation of the demand on a given outlet, such as increasing the volumetric flow through that outlet, will cause variations in the supply available to the other outlet ports, i.e., for the previous example, decrease the volumetric flow. When the demand upon a given outlet port is increased, the manifold assembly of the present invention, including the regulating valve and associated diaphragm mechanism, will allow a greater valve opening and thus increase the flow of fuel to the diaphragm chamber and correspondingly increase the flow of fuel available to the various outlet ports, thereby insuring that a supply of gaseous fuel at constant pressure will always be available to each outlet. In a like manner, a decrease in the volumetric demand upon a given outlet port will increase the pressure within the diaphragm chamber and allow a lesser valve opening and a correspondingly reduced flow through the regulating valve, thereby providing a supply of gaseous fuel at constant pressure to each of the outlet ports.

Although minor modifications might be suggested by those versed in the art, it should be understood that I wish to embody within the scope of the patent warranted hereon all such modifications as reasonably and properly come within the scope of my contribution to the art.

I claim:

1. A regulator valve for supplying fuel from a common source to a plurality of propane appliances comprising:
    a valve body having an inlet passageway and a diaphragm chamber formed therein;
    a diaphragm extending across said diaphragm chamber;
    a cap member connected to said body and clamping the edges of said diaphragm between said valve body and said cap member;
    a spring biased valve in said body having an inlet and an outlet and having actuator means extending outwardly therefrom, said valve body having passage means formed therein extending from said inlet passageway to said inlet of said spring biased valve and from said outlet of said valve and opening into said diaphragm chamber;
    continuous biasing means in said cap member urging said diaphragm toward said actuator means; and
    means forming a plurality of separate outlet passageways each extending through said body and each having one end opening into said diaphragm chamber, said outlet passageways being radially spaced-apart in said body, and each of said outlet passageways further having another end for receiving fluid from said diaphragm chamber and supplying fuel to a separate point of utilization.

2. A regulator valve as defined in claim 1, further characterized by: each said outlet passageway having a restricted orifice therein so that back pressure will act on one face of said diaphragm in opposition to said continuous biasing means.

3. A regulator valve as defined in claim 1 further characterized by:
    said cap member having a bore disposed on an axis intersecting said diaphragm;
    a coil spring in said bore having one end thereof operatively engaging said diaphragm;
    a washer bottoming the other end of said spring; and
    a retainer adjustably positioned in said bore and locking said washer in a precalibrated relationship.

4. A regulator valve as defined in claim 1, wherein said means forming a plurality of separate outlet passageways comprises: an outlet fitting in each said outlet passageway; and valve means in each said fitting for normally preventing fluid flow through said associated passageways.

5. A regulator valve as defined in claim 4, further characterized by: connection means for engaging each said fitting and formed to actuate said valve means of said fitting for permitting fluid flow through said associated outlet passageway.

6. A regulator valve as defined in claim 5, further characterized by:
    each said outlet fitting having a passageway formed therethrough;
    each said outlet passageway valve means including a spring biased valve disposed in said passageway of said fitting and having an inlet and an outlet and also having actuator means extending outwardly therefrom; and
    each said connection means including a pusher pin for engaging said actuator means.

7. A regulator valve as defined in claim 5 further characterized by:
    each said outlet fitting having a conical recess formed in the outlet end thereof;
    each said connection means having a generally spherically shaped shoulder for engaging said conical recess to form a mechanical seal.

8. A regulator valve as defined in claim 1 further characterized by:
    said actuator means of said valve in said body including a pin extending outwardly of said valve for operative engagement with said diaphragm; and
    abutment means between the end of said pin and said diaphragm to transmit forces between said pin and said diaphragm.

UNITED STATES PATENT OFFICE
CERTIFICATE OF CORRECTION

Patent No. 3,557,818      Dated January 26, 1971

Inventor(s) William J. Rohde

It is certified that error appears in the above-identified patent and that said Letters Patent are hereby corrected as shown below:

Column 2, line 36, "s standard" should read -- a standard --. Column 3, lines 7 to 10, cancel "A cap 44 including an internally threaded portion 45 for threadedly engaging an externally threaded portion 46 formed on the body 25 is secured to the body 25.".

Signed and sealed this 11th day of May 1971.

(SEAL)
Attest:

EDWARD M. FLETCHER, JR.            WILLIAM E. SCHUYLER,
Attesting Officer                  Commissioner of Patei